G. W. SEAGO.
NUT LOCK.
APPLICATION FILED JAN. 7, 1910.
1,007,738.
Patented Nov. 7, 1911.
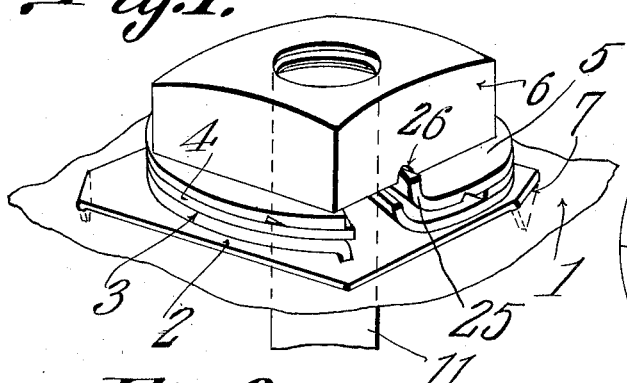
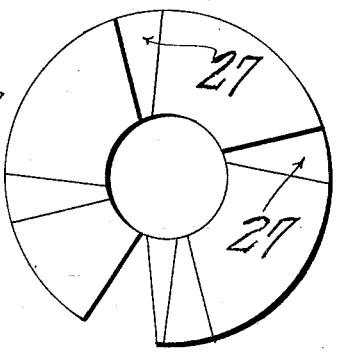
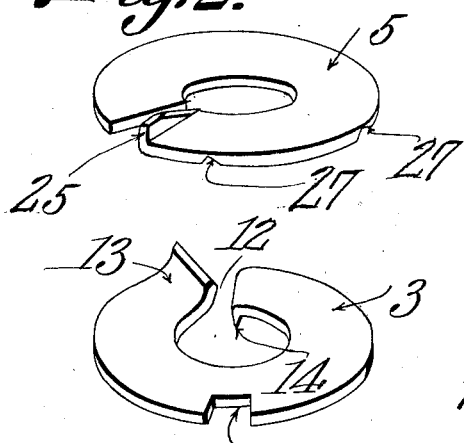
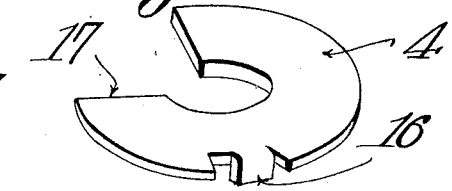
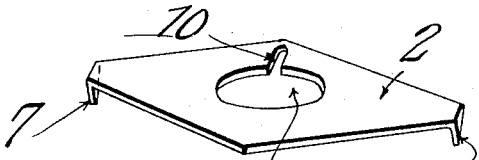
Witnesses
Inventor
George W. Seago.

UNITED STATES PATENT OFFICE.

GEORGE W. SEAGO, OF EROS, LOUISIANA.

NUT-LOCK.

1,007,738. Specification of Letters Patent. Patented Nov. 7, 1911.

Application filed January 7, 1910. Serial No. 536,875.

*To all whom it may concern:*

Be it known that I, GEORGE W. SEAGO, a citizen of the United States, residing at Eros, in the parish of Jackson and State of Louisiana, have invented a new and useful Nut-Lock, of which the following is a specification.

This invention relates to nut locks.

The objects of the invention are to improve and simplify the construction of such devices as well as to increase their efficiency in use and permit them to be removed without mutilation.

With the foregoing and other objects in view, which will appear as the description proceeds, the invention resides in the combination and arrangement of parts and in the details of construction hereinafter described and claimed, it being understood that changes in the embodiments of invention herein disclosed can be made within the scope of the claim without departing from the spirit of the invention or sacrificing any of its advantages.

In the accompanying drawing forming a part of this specification, Figure 1 is a perspective view showing the preferred form of the invention. Fig. 2 is a similar view of the guard washer used in Fig. 1. Fig. 3 is a perspective of the blank washer. Fig. 4 is a similar view of a spring washer or plate. Fig. 5 is a perspective view of a base plate. Fig. 6 is a view looking at the bottom of the guard washer shown in Fig. 2.

Like reference numerals indicate corresponding parts in the different figures of the drawing.

The reference numeral 1 in Fig. 1 of the drawing indicates a body made of wood or other suitable material on which the nut lock is placed. The nut lock proper consists of a base plate 2 shown in Fig. 5, a spring plate or washer 3 shown in Fig. 4, a blank washer or plate 4 shown in Fig. 3, a guard washer 5 shown in Fig. 2 and a nut 6 shown in Fig. 1, the different parts being suitably superimposed upon each other, the plate 2 being next to the wooden body 1 as shown in Fig. 1, the spring washer 3 upon the plate 2, the blank washer 4 upon the spring washer 3, the guard washer 5 next and the nut 6 upon the guard washer 5. The base plate 2 as shown in Fig. 5 is provided at the corners thereof with points or projections 7 which bite into the body 1 and prevent the base plate from rotating, said base plate being also formed centrally with a bolt opening 9 and a notch or slot 10. In assembling the parts of the nut lock, the bolt 11 shown in Fig. 1 will pass through the body 1. The base plate 2 is then fitted over said bolt and the projections 7 are caused to bite into the body 1. The spring plate or washer 3 shown in Fig. 4 is then fitted over the bolt 11. This spring or washer 3 is cut away as indicated at 12 and is formed on one side of said cut away portion with an upwardly extending spring portion 13, the end of the washer 3 opposite the spring 13 being bent downwardly as indicated at 14 to produce a projection which is adapted to fit into the slot 10 of the base plate so as to prevent rotation of the washer 3 upon said base plate.

At the portion of the spring washer 3 opposite the spring 13, said washer is cut away as indicated at 15 to receive a downwardly bent tongue or projection 16 formed upon the blank washer 4 as shown in Fig. 3. The portion of said blank washer 4 opposite the projection 16 preferably is cut away for about one quarter of the circumference of the washer 4 as indicated at 17. This cut away portion 17 when the blank washer is assembled on top of the spring washer 3, registers approximately with the spring 13 and affords a chamber or space in which said spring can vibrate, the function of the blank washer 4 thus being to prevent the nut 6 and guard washer 5 from being screwed down so tightly onto the spring washer 3 as to flatten down the spring 13 and prevent it from acting in its proper manner. It will be obvious that the projection 16 on the blank washer 4 by engaging the cut away portion 15 of the spring washer 3 prevents any relative displacement or rotation of the washer 4. Disposed on top of the blank washer 4 is a guard washer 5 which is adapted to be rotated part of the time with the nut 6. The washer 5 as shown in Fig. 2 is formed on its upper surface with a rib or projection 25 which is adapted to engage a notch 26 in the inner face of the nut 6. The washer 5, in its lower face is formed with a series of grooves or notches 27 which are radially disposed as indicated in Fig. 6 and are adapted to receive the end of the spring 13 for preventing reverse movement of the nut 6 and guard washer 5 when said parts have been once properly screwed into position. It will be obvious that when the nut 6 has been screwed down upon the bolt 11 far enough for the projection 25 of the guard washer 5 to engage the notch 26 of the nut 6, the nut 6 and guard washer 5 will rotate together, the spring 13 of the spring washer 3 flitting into and out of the notches or grooves 27 until the nut and guard washer have been screwed down as tightly as desired, after which the spring 13 serves, by engaging one of the grooves 27 of the guard washer 5, to prevent any loosening of the nut 6.

The nut lock of the present invention is strong, simple, durable and inexpensive in construction as well as thoroughly efficient and practical in use.

What is claimed as new is:

A nut lock comprising a base plate having a projection thereon and being formed with a bolt hole and a slot opening therefrom, a spring plate mounted on said base plate and having a spring extension on one side and a cut away portion at the other side thereof, means for securing the spring plate against rotation relative to the base plate, a blank washer mounted on said spring plate and having a projection to engage the cut away portion of said spring plate, the opposite side of said blank washer being cut away to receive the spring extension of said spring plate, a guard plate imposed upon said blank washer and having a series of notches on one side adapted to be engaged by the spring extension of said spring plate, said guard washer having on the opposite side thereof a projection, and a nut having a notch therein adapted to receive the projection on said guard washer.

In testimony that I claim the foregoing as my own, I have hereto affixed my signature in the presence of two witnesses.

GEORGE W. SEAGO.

Witnesses:
J. R. HENRY,
W. S. MOORE.

---

Copies of this patent may be obtained for five cents each, by addressing the "Commissioner of Patents, Washington, D. C."